United States Patent [19]

Shumate

[11] 4,212,129
[45] Jul. 15, 1980

[54] INSECT TRAP

[75] Inventor: Billy R. Shumate, Hayes, N.C.

[73] Assignees: Richard Dean Roberts, Wilbar; Robert L. Brewer, Winston-Salem, both of N.C. ; part interest to each

[21] Appl. No.: 32,496

[22] Filed: Apr. 23, 1979

[51] Int. Cl.² ............................................. A01M 1/04
[52] U.S. Cl. ...................................................... 43/113
[58] Field of Search ..................... 43/113; 362/95, 183

[56]  References Cited

U.S. PATENT DOCUMENTS

| 720,990 | 2/1903 | Williams | 43/113 |
| 836,052 | 11/1906 | Pool | 43/113 |
| 3,192,378 | 6/1965 | Oldenburger | 362/183 |
| 3,250,909 | 5/1966 | Oldenburger | 362/183 |

FOREIGN PATENT DOCUMENTS 885497  7/1949  Fed. Rep. of Germany ............. 43/113

Primary Examiner—Nicholas P. Godici
Attorney, Agent, or Firm—B. B. Olive

[57]  ABSTRACT

An insect trap comprises a tubular body compatible with a discarded drink container with one or more of the ends removed to receive removable end funnels as points of entry for the insects. An internally mounted electric lamp is associated with a prong connector adapted to mount in an AC household outlet. The prong connector serves the dual functions of providing both mechanical support and a source of power when the trap is operated in one mode directly from an AC household outlet. In an alternative embodiment, a rechargeable battery pack is enclosed within the cannister and the prong connector provides a means for recharging the battery pack as well as providing means for mechanically supporting the trap when operated directly from an AC household outlet.

7 Claims, 5 Drawing Figures

INSECT TRAP

BACKGROUND OF THE INVENTION

1. Field of the Invention

This invention relates generally to insect traps and more particularly to an insect trap designed to be mechanically supported and energized from an AC household outlet.

2. Description of the Prior Art

Insect traps having a cylindrical body and a removable conical-shaped end wall for entry and trapping of the insects have been known. It has also been known to employ a light within the trap as a means of attracting the insects through the trap entry.

With all of the prior art in mind, it has not been heretofore known, so far as applicant is aware, to provide an insect trap of the type having a light within the trap and arranged in such a manner that the trap can be both mechanically supported and energized from an ordinary AC household outlet. Further, so far as is known, no prior insect trap has been devised in such a manner that it can be assembled from an ordinary discarded metal drink can such as are widely used for containing soft drinks, beer and the like, a night lamp assembly of the type that is supported and energized from an AC household outlet and by using one or more commonly available metal funnels as end walls for the trap. Thus, the present invention has the achievement of such a trap as its objective.

SUMMARY OF THE INVENTION

The insect trap of the present invention is illustrated in two embodiments both of which utilize a cylindrical body which may be readily formed from a discarded metal drink can or the like and with either or both of the ends removed dependent on whether a single entry or double entry trap is desired. Each open end receives in a detachable manner a commercially available funnel. A night lamp assembly is fitted to the cylindrical body in a manner enabling the AC prongs of the night lamp assembly to mechanically support and energize a lamp which is contained within the trap. The exterior of the cylindrical body is preferably painted black and the funnel surfaces and interior surface of the cylindrical body are left as shiny as possible so as to enhance the effect of the light.

In another embodiment a rechargeable battery pack is mounted within the cylindrical body and is provided with AC prongs enabling the pack to be recharged directly from an AC outlet and to also provide a battery operated lamp which can be utilized on picnic tables and the like remote from such an outlet.

DESCRIPTION OF THE PREFERRED EMBODIMENT

Figure 1:
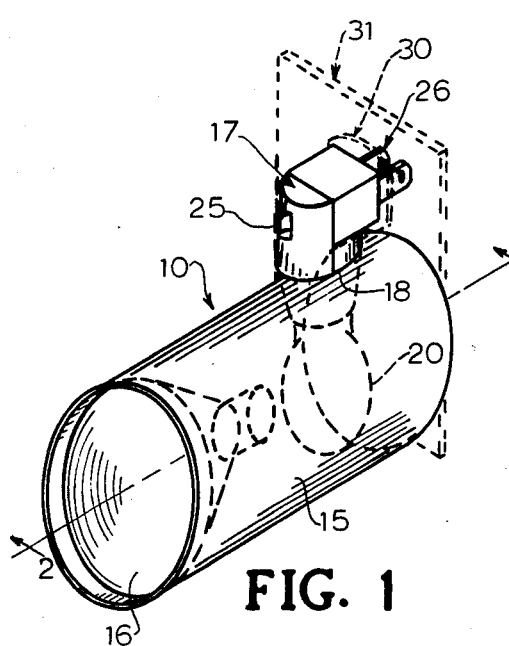
FIG. 1 is a perspective view of an insect trap having a single entrance and with portions of the funnel entrance, lamp and supporting outlet structure indicated in dashed lines.
Figure 2:
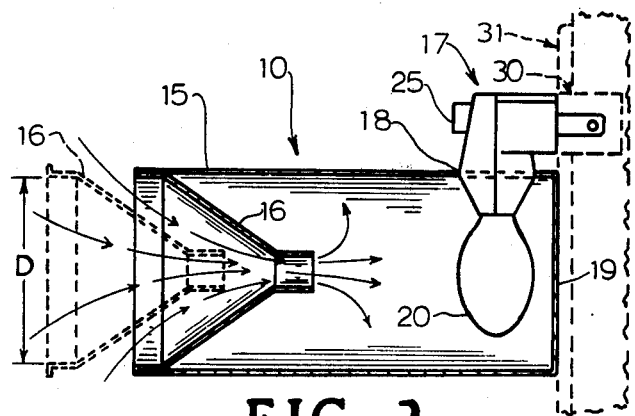
FIG. 2 is a section view taken on line 2—2 of FIG. 1 and showing in dotted lines how the funnel entry may be removed for cleaning purposes.

Referring initially to the first embodiment illustrated in FIGS. 1 and 2, the insect trap 10 is made up of three components, namely, a cylindrical body or can 15, a removable funnel member 16 fitted in one open end of body 15 and a wall-type lamp assembly 17 snugly fitted in a hole 18 in the side of body 15 proximate the closed end 19 of body 15. Funnel member 16 may be fabricated in the shape indicated or may be selected from the wide range of commercially available funnels with dimension D being selected to snugly fit the inside diameter of the cylindrical body 15 so as to allow the funnel member 16 to be easily removed, as indicated in FIG. 2, when necessary for removing trapped insects and the like. It is desirable that the entry surface of funnel member 16 retain its typical light metal surface and that the internal surface of body member 15 also be preserved as a light metal finish and with the external surface of body member 15 painted black or other dark color. In this manner when the lamp 20 is energized, a relatively bright reflected light source is available to attract the insects through funnel member 16 and into the trap 10.

Lamp assembly 17 is generally commercially available in the form depicted in the drawings and includes a switch 25 and a set of AC prongs 26 adapted to mount into an ordinary AC household outlet 30 on appropriate wall structure 31. Since funnels suited to the purposes of funnel member 16 are commercially available as well as wall lamp assemblies such as the depicted wall lamp assembly 17 it will be appreciated that an insect trap such as trap 10 illustrated in FIGS. 1 and 2 can be very quickly assembled from a suitable size discarded drink can by forming hole 18 to snugly fit the lamp assembly 17 as depicted, and using an appropriate cement at the join, installing the appropriately sized funnel 16 and painting the exterior of the can black or other suitable dark color. Once made, the trap 10 is simply secured into an appropriate wall outlet and is energized by means of switch 25 so as to become immediately available for attracting and capturing insects and the like. In this regard, it will be noticed that the AC prongs 26 serve the dual function of providing both mechanical support for insect trap 10 as well as providing means for energizing lamp 20. This, of course, means that there is no need for lengthy electrical cords and the like which have been typical of prior insect traps using electric lamps as part of the trap assembly.

Figure 3:
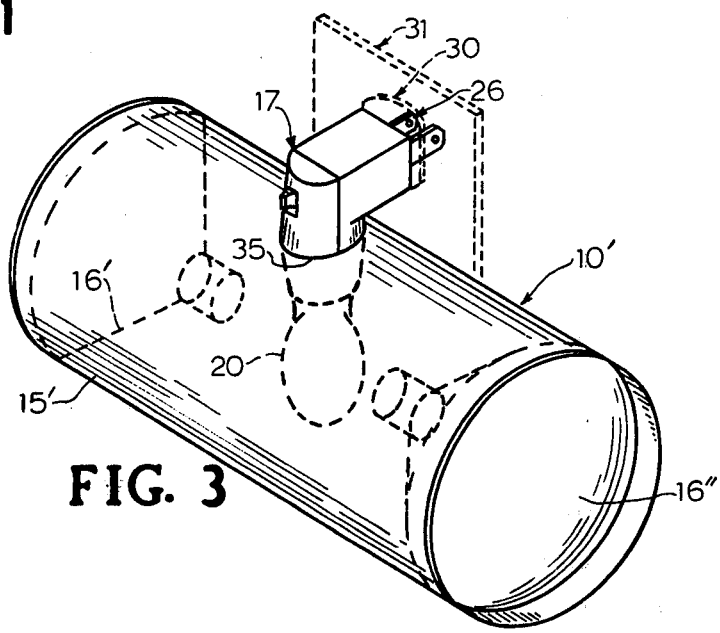
FIG. 3 is a perspective view of a second embodiment having two removable entry funnels according to the invention.

In a second embodiment depicted in FIG. 3 the cylindrical body or can member 15' detachably receives a pair of funnel members designated 16' and 16" and the lamp assembly 17 in this embodiment is mounted in a hole 35 formed in the side of body member 15' in a more central location as illustrated in FIG. 3. As with the first embodiment, the exposed funnel surfaces of funnel members 16', 16" are preferably left in a light metal finish as is the internal surface of body member 15' and the external surface of body member 15' is preferably painted in a dark black color. In use, it will also be noted that the AC prongs 26 serve both to mechanically support the insect trap 10' of the second embodiment and also provide a means for energizing the lamp 20. Lamp assembly 17 may be cemented at the join.

Figure 4:
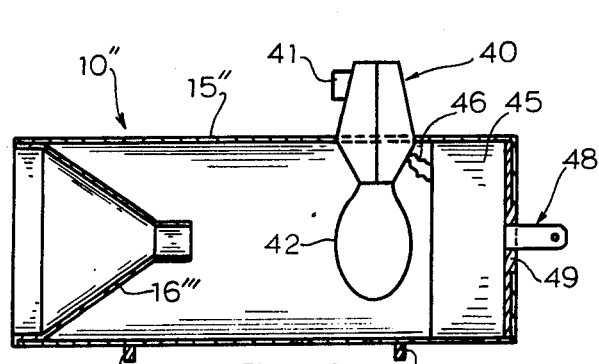
FIG. 4 is section view illustrating a third embodiment utilizing a rechargeable battery pack and FIG. 5 is an end view.
Figure 5:
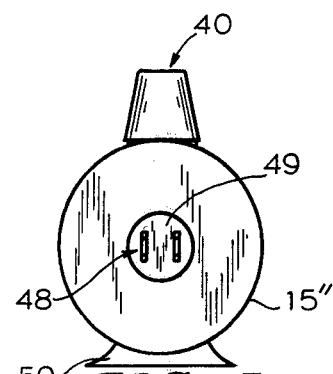

In a third embodiment illustrated in FIG. 4 the body member 15" is open at one end to removably receive a suitably sized funnel member 16"'. As with the prior embodiments, the exposed surfaces of funnel member 16"' are preferably left in a light bright metal finish as is the internal surface of body member 15". Also, as with the prior embodiments, the external surface of body member 15" is preferably painted black or other suitable dark color. A modified lamp assembly 40 contains a switch 41 and is cemented or otherwise secured in a hole 44 and mounts a lamp 42 having appropriate electrical characteristics to match the output of a rechargeable battery pack 45 connected through conductors 46 to the lamp assembly 40. In this third embodiment, recharging of battery pack 45 is accomplished by inserting the AC prongs 48 in a suitable AC household receptacle. Alternatively, by proper choice of the battery and rectifier components in the rechargeable pack 45, lamp 42 may also be operated directly from an AC outlet and supported in the manner previously described. Also, once the battery pack 45 is fully charged the insect trap 10" of the third embodiment may be employed on an outdoor picnic table, or the like, remote from an AC outlet. Since battery packs which are adapted to being recharged directly from AC outlets are known in the prior art and are available with a wide range of circuit configurations, no further description is deemed necessary. For example, rechargeable battery packs of this general description are disclosed in U.S. Pat. Nos. 3,067,373, 3,109,132 and 4,084,123.

An appropriate insulating plate or grommet 49 mounts on prongs 48 and suitable support members 50 enable the body member 15" to be supported on a picnic table or the like remote from an AC outlet when dependent on the battery charge.

What is claimed is:

1. An insect trap, comprising:
   (a) a cylindrical body member having at least one open end;
   (b) a funnel member removably fitted in each such open end;
   (c) a unitary lamp assembly including at least a switch, lamp mount and lamp, said assembly being mounted in the sidewall of said body member with said lamp being located internally and said switch being located externally thereof;
   (d) an AC prong assembly secured to and having prongs extending outwardly and externally of said body member and adapted to mate with an AC wall outlet for supporting said body member therefrom and providing a source of power for energizing said lamp; and
   (e) circuit means operatively associated with said lamp and prong assemblies enabling said lamp to be energized through power supplied through said prong assembly.

2. A trap as claimed in claim 1 wherein said lamp assembly includes said circuit means and prong assembly.

3. A trap as claimed in claim 1 wherein said circuit means includes a rechargeable battery pack mounted within said body member, said AC prong assembly mounts directly on said pack and the prongs thereof provide means for recharging said pack and including means electrically connecting said prong assembly with said lamp assembly.

4. A trap as claimed in claim 1 wherein said body member has both ends open, a said funnel member is mounted in each such open end and said lamp assembly is mounted between said funnel members.

5. A trap as claimed in claim 2 in which said body member has one open end in which a said funnel member is mounted and said AC prongs are oriented to maintain the central axis of said body member substantially horizontal when inserted in a said AC outlet.

6. A trap as claimed in claim 2 in which said body member has both ends open with a said funnel member mounted in each said open end, said lamp assembly mounts in the sidewall of said body member between the pair of said funnel members and said prongs are oriented to maintain the central axis of said body member substantially horizontal when inserted in a said AC outlet.

7. An insect trap, comprising:
   (a) a cylindrical body member having at least one open end;
   (b) a funnel member removably fitted in each such open end;
   (c) a unitary lamp assembly including at least a lamp mount and lamp, said assembly being mounted in the sidewall of said body member with said lamp being located externally thereof;
   (d) an AC prong assembly secured and having prongs extending outwardly and externally of said body member and adapted to mate with an AC wall outlet for supporting said body member therefrom and providing a source of power for energizing said lamp; and
   (e) circuit means operatively associated with said lamp and prong assemblies enabling said lamp to be energized through power supplied through said prong assembly.

* * * * *